Patented June 14, 1938

2,120,227

UNITED STATES PATENT OFFICE 2,120,227

PURIFICATION OF GLYCEROL

Gilbert W. Brant, Buffalo, N. Y., assignor to E. I. du Pont de Nemours & Company, Wilmington, Del., a corporation of Delaware No Drawing. Application April 21, 1937, Serial No. 138,230

16 Claims. (Cl. 260—156.5)

This invention relates to the purification of glycerol, and more particularly, it relates to the removal of odorous impurities as well as odor-producing impurities from glycerol to render the same suitable for use in regenerated cellulose structures.

The production of glycerol as it is known in the art comprises the evaporation of impure, dilute, water-glycerol mixtures to obtain crude glycerol of about 80% concentration. Prior to the evaporation, certain types of impurities are more or less completely removed by precipitation as the salts of heavy metals and filtration. The 80% crude glycerol which is still very impure is steam-distilled under vacuum to obtain a more or less impure, once distilled glycerol of 95% concentration or higher. This once distilled glycerol is then redistilled and decolorized to obtain glycerol of C. P., U. S. P. and similar qualities. The color is removed by treating the glycerol with a small quantity of decolorizing or activated charcoal for a relatively short time, e. g. 10 to 60 minutes, at a temperature of 75° to 80° C. and filtering. Commercial glycerol of C. P., U. S. P. and similar qualities contains impurities which are dependent upon the quality of crude glycerol used, the temperature to which the glycerol has been subjected during distillation, the nature of the impurities originally present, and the care exercised in the various processing steps. To obtain glycerol of the highest commercial grades, only high grade crudes can be used. In some cases double distillation and decolorization of what are considered to be high grade crudes fail to yield glycerol of sufficient purity for satisfactory use for purposes in which odor is objectionable. Such glycerol may be water-white and entirely satisfactory in all respects except that it has an objectionable odor or develops such an odor under the conditions of its subsequent use.

Heretofore, only glycerol which, as commercially produced, is sufficiently free from odorous or odor-forming impurities to be acceptable for these critical uses, could be so used. In most cases additional distillation treatment does not appreciably improve the glycerol in this respect. It has been considered necessary, therefore, to discard for these uses, all glycerols which, as commercially produced, do not meet the rigid requirements of such uses with respect to this characteristic.

It has been found that previously known glycerol of high grading, in some cases even so-called chemically pure glycerol, when used for certain purposes where it will be maintained in contact with the atmosphere or substances having a low pH, or exposed to light for extended periods of time, will develop an odor even though it was water white and practically odorless when freshly prepared.

This objectionable character of glycerol is no doubt due to the fact that certain odor-developing impurities are distilled over with the glycerol even with those fractions distilled within carefully chosen temperature ranges.

Whether or not these objectionable characteristics of glycerol have been known before, they have been found to be especially obnoxious in the production of regenerated cellulose pellicles in which glycerol is used as a softening agent.

In the manufacture of regenerated cellulose film, large amounts of glycerol are required to produce properly flexibilized material. Such films usually contain 10–20% or more of glycerol as a softener for the cellulose. When this glycerol is not of the highest purity, the films may develop an obnoxious odor which makes it unsuitable for many uses. The film, for instance, has wide application in the wrapping and packaging of foodstuffs. When obnoxious odors are developed in such film, not only is the package objectionable, but the material wrapped acquires this obnoxious odor which persists after unwrapping, to the detriment of the value of the goods. Furthermore, many of the products wrapped in this cellulose film are judged by their aroma, such for example as tobacco products, cigars and cigarettes, coffee, bakery products and perfumed articles. Any variation in the fragrance of the package or of the article contained therein will be most detrimental to the value of the article. A serious feature of the problem is the slow development of the odor when the glycerol, or a regenerated cellulose film containing the glycerol is subjected to certain agencies or conditions. The glycerol, as obtained from the manufacturer, may be and very often is crystal clear and quite free from odor, but not from odor forming substances. However, after impregnation of the film and subsequent treatment required to finish the film, an odor may be developed which makes the film quite valueless for the purpose for which it was designed. Even more serious is the case in which the recently manufactured film still has no detectable odor, but where such an odor eventually develops after the film has been used to wrap merchandise and prior to use of the merchandise. In such a case the loss in value of the merchandise may be many times the value of the film. With reference to the development of the odor, it is often impossible to guard against such difficulties, and it may even be impossible to detect such odors before the merchandise reaches the consumer because such odors may not be detectable except in confined spaces.

The peculiar requirement in the production of regenerated cellulose film, therefore, is an adequate supply of glycerol of such purity that it not only possesses no color, nor odor, but will remain colorless and odorless when subjected to the severe conditions of heating and oxidation encountered in the preparation of the film, or when subjected to conditions that tend to develop such an odor over a long period of time. It is necessary that glycerol for this purpose shall be of a purity in excess of that heretofore required by U. S. P. or C. P. standards. The mere absence of odor in glycerol as obtained from the manufacturer is not sufficient evidence that film in which it is used will have, or will develop no undesirable odor. The odor in the film is determined by the following test applied to an uncoated film: A sheet or film measuring approximately 18 inches by 40 inches is tightly rolled. The roll is cut into short sections which are allowed to fall into a clean, dry glass bottle (discarding the two end sections which have been handled). The bottle is closed by a cardboard cap lined with a layer of the same film as that being tested. After standing for a period of one hour at room temperature, the cap is removed and the air in the bottle is smelled to note if any odor can be detected.

It may readily be appreciated that once the glycerol is incorporated in the film, and the film subsequently develops an objectionable odor because of the glycerol, it may then be too late to take steps preventing the spoilage of film by the remainder of that particular batch of glycerol, which by that time, may have been consumed. The following accelerated tests applied to a sample of the glycerol will enable one to predict accurately whether or not the glycerol to which it is applied will be satisfactory when used in film: Ten cc. of glycerol and 10 cc. of distilled water are mixed in a 100 cc. beaker. Ten cc. of 0.5% sulfuric acid are added and the mixture heated to 75° C. The glycerol is then allowed to cool to 55–65° C. and is tested for odor by smelling the same. Glycerol which develops no more than the slightest trace of odor in this test has been found to yield a perfectly satisfactory product, when used as a softener for regenerated cellulose film.

It has now been found that glycerol which has been subjected to the usual distillation and decoloration with charcoal, but which still develops an odor under the conditions of the above test may be further purified and thereby made quite satisfactory for use in the manufacture of regenerated cellulose film.

It is therefore an object of this invention to produce colorless and odorless glycerol which is substantially free from odor-forming impurities.

It is another object of this invention to produce glycerol that will remain substantially colorless and odorless after standing for an extended period of time under conditions which cause the development of odor in less pure glycerol.

It is a further object of this invention to produce glycerol that will remain substantially colorless and odorless when used in regenerated cellulose structures.

Other objects of the invention will be apparent from the description that follows.

In general, these objects are attained by adding to glycerol of inferior quality a small amount of powdered, activated carbon, preferably a carbon of vegetable origin, mixing it thoroughly therewith and maintaining it in contact with the glycerol, preferably with continued agitation, for a period of at least 6 and preferably 12 to 24 hours and then separating the carbon from the glycerol.

The activated charcoal to be used in accordance with this invention should be either an acid charcoal or the charcoal-glycerol mixture should be slightly acidic. By the term "acid charcoal" is meant charcoal, the water extract of which is distinctly acid in character. Ten grams of acid charcoal, when leached with 100 cc. of distilled water will yield an acid extract having a pH value of below 6, and preferably between 2 and 6. An acid charcoal of this type is found to have sufficient acidity to make a charcoal-glycerol mixture slightly acid. When using a charcoal having a neutral or somewhat alkaline character, the charcoal-glycerol mixture should be adjusted to have a pH value less than 7.

In accordance with the preferred embodiment of this invention, the glycerol is simultaneously treated with an oxidizing agent, preferably hydrogen peroxide, and an activated vegetable charcoal of the type above described, at a temperature below 50° C., and preferably below 40° C. After the glycerol has remained in contact with the charcoal for a period of at least 6 hours and preferably 12 to 24 hours or more, the latter is filtered off at room temperature.

The following detailed examples will serve to illustrate several specific embodiments of the invention, it being understood that the invention is not to be specifically limited thereto.

*Example I*

Hydrogen peroxide (calculated at 100% $H_2O_2$) in quantity equal to 0.05% of the glycerol weight is mixed with 95% glycerol in a suitable mixer. Finely powdered activated carbon, the water extract of which is distinctly acid, and which is known to the trade as Nuchar-WA, in quantity equal to 2% of the glycerol weight, is then added and the whole agitated for 16 hours at room temperature. The mixture is then passed through a filter press at room temperature, until a crystal clear product is obtained. The filtered glycerol, when tested for developed odor with sulfuric acid as described above, is found to develop substantially no odor.

*Example II*

Hydrogen peroxide (calculated at 100% $H_2O_2$), in quantity equal to 0.06% of the weight of the glycerol, is mixed with 95% glycerol in a suitable mixing apparatus. 2.5% of finely powdered activated vegetable carbon, the water extract of which is distinctly acid, is added to the mixture. Water is added to the mixture to bring the total strength of the glycerol to 85%. The whole mass is slowly agitated for 14 hours at room temperature to prevent the carbon from settling. The mixture is then passed through a filter press until it runs crystal clear, after which it is passed to a storage receiver. The filtered glycerol, under normal storage conditions remains crystal clear for long periods of time without developing any noticeable odor. The filtered glycerol may be used for softening of regenerated cellulose pellicles which will not develop any noticeable odor due to the glycerol present even though permitted to stand for a prolonged period of time in an enclosed space.

Example III

A quantity of 95% glycerol is mixed with 2.5% of the weight of the glycerol of finely powdered activated vegetable carbon, the water extract of which is distinctly acid, and which is known to the trade as Nuchar-W. The mixture is slowly agitated for a period of 16 hours at room temperature, after which it is passed through a filter press. The glycerol which first passes through the filter press is returned to the mixture until it runs crystal clear, after which it will be passed to a storage reservoir. The filtered glycerol is suitable for use in the production of regenerated cellulose pellicles which are to be used for wrapping foodstuffs and the like. Ten cc. of the filtered glycerol added to 10 cc. water and 10 cc. of 0.5% $H_2SO_4$ and heated to 75° C. and then cooled will give off only the slightest trace of odor.

The vegetable charcoal that I prefer to use is a material made from residual organic material incidental to cellulose manufacture, such as the waste products of paper mills, and which has been activated in such a manner that due to its source and method of activation, its water extract is distinctly acid when tested with litmus paper. I have found that the product known to the trade as Nuchar-W, which is distributed by the Industrial Chemical Sales Company, Inc., 230 Park Avenue, New York City, is particularly well suited to this process. In its powdered form it is characterized as having not more than a small amount of water extractable material and an acid condition upon the surface as indicated by the relatively lower pH of an extract of the carbon made with neutral water. However, any carbon obtained from a vegetable source and having an acid surface condition will be suitable. Activated charcoal which is neutral or somewhat alkaline may also be used if the charcoal-glycerol mixture is slightly acid. Such a mixture should have a pH value less than 7 during the entire purification procedure. Activated charcoal of other origin than vegetable, such as bone char, as well as other adsorption agents having a strong adsorption for odors, although somewhat inferior to vegetable charcoal, may be used for the purpose of this invention if properly activated so that the water extract of the adsorption agent is distinctly acid. While it is preferred to suspend the adsorptive material in the glycerol as a fine powder during the period of treatment, it is also possible to maintain beds of granular or powdered material and circulate the glycerol therethrough.

It is necessary that the charcoal remain in contact with the glycerol for a period of at least 6 hours and preferably for a period of from 12 to 24 hours in order to obtain the required results. It is also preferred that the treatment with the charcoal be carried out at a temperature of less than 50° C. It appears that in the treatment of glycerol with charcoal as generally practiced heretofore, it was considered that after a period of 10 to 60 minutes, it was useless to continue the treatment with the charcoal; that the charcoal had functioned to its optimum capacity. The fact that if the treatment of glycerol with activated charcoal is continued for from 8 to 24 hours it will remove odorous constituents as well as odor-developing impurities comes as a great surprise. It is still more surprising to find that relatively poor grades of glycerol which were never contemplated for use where odor was objectionable, could be refined by the treatment of my invention to make it suitable for the most critical uses in which odorous glycerol is most objectionable.

Hydrogen peroxide is obtained in 30% aqueous solution; at the time of use, its condition as determined from analysis should approximate the specifications. It is well known that upon standing, some deterioration results.

Although hydrogen peroxide is much superior to other similar oxygen yielding substances, it is also possible to employ, in lieu of a solution of hydrogen peroxide, such as that sold commercially, any solution which yields hydrogen peroxide under the conditions of treatment. Thus, I may use a metal peroxide, or a solution containing an alkali metal peroxide such as sodium peroxide, or an alkaline earth metal peroxide with an acid such as sulfuric or hydrochloric. Similarly, I may use a solution of a metal persalt such as an alkali metal percarbonate, an alkali metal perborate or an alkali metal persulfate in an environment providing an excess of acid. In brief, any solution which yields hydrogen peroxide under the maintained conditions specified in the process, or is equivalent to hydrogen peroxide under these conditions comes within the scope of my invention. Also, ozone may be added to the solution or generated directly therein by means of an ozonizing apparatus or gaseous oxygen may be passed in under pressure. If the presence of small amounts of certain impurities in the resulting glycerol would not be injurious, or if it is desired to remove these impurities by means of further treatment small additions of aqueous solutions of chlorine or hypochlorous acid may be made; in this case, the impurity remaining in the glycerol will be hydrochloric acid. Other oxidizing agents that might be substituted include the alkali chromates, the dichromates or permanganates.

While glycerol obtained as a by-product in the soap industry has been chiefly considered, this method of purification may be applied for the removal of odors from glycerols from other sources, such as fermentation processes and syntheses. The glycerol to be purified may be treated in accordance with the present invention in relatively high concentrations or diluted with water. Glycerol containing as high as 50% water may be treated advantageously as well as 95% glycerol.

I have found that crude glycerol subjected to distillation, even several successive distillations, does not give an odorless product when applied to regenerated cellulose film, nor does the accelerated test that I use of acidifying and heating the glycerol so purified indicate a satisfactory product. The use of chars for the removal of color from glycerol is well known in the art; however, in such known decolorization methods it was only necessary to treat the glycerol for relatively short periods (generally 10 to 30 minutes). Prior to this invention it was unknown that odorous impurities in a liquid system, such as glycerol, can be removed by the char, when they are not removable by distillation, the common method of purification of glycerol. Surprisingly, the treatment with char in accordance with the present invention removes not only the odorous substances from glycerol, giving thereby an odor free product, but removes as well substantially all potential odor-forming materials which may subsequently develop an odor either in regenerated cellulose film, or in the accelerated test that is described above. It is highly unobvious that certain impurities will be removed from a grade of glycerol that may be crystal clear and quite free from any objectionable odor, which are, in themselves, not odorous, but which may develop an odor when subjected to the conditions obtaining in the preparation and use of regenerated cellulose film.

While a satisfactory product may be obtained by the above-described use of vegetable char alone for the purification of distilled glycerol, it is preferred to use in conjunction with the char a simultaneous treatment with hydrogen peroxide or the like. There are several advantages to be gained by a combination of the two reagents. First, it has been found that the addition of a small amount of hydrogen peroxide will materially reduce the amount of char necessary to accomplish the purification. Second, it will likewise decrease the time of treatment. Third, the use of hydrogen peroxide results in a product of slightly higher purity than that obtainable in its absence. Tests have shown that the treatment of glycerol with hydrogen peroxide without the use of char results in a product which is in no wise improved and which, in many instances, is more odorous when used in regenerated cellulose film than glycerol which has not received such treatment. It is surprising, therefore, that the use of hydrogen peroxide in connection with char would give an improved product and a more satisfactory process of treatment.

It should be observed that the actions of the hydrogen peroxide and of the char are not independent and for this reason the preferred purification treatment consists of the simultaneous application of both hydrogen peroxide and char.

It might be supposed that a relatively high temperature of operation would be desirable due to the viscosity of the glycerol. There are certain objections to the use of a high temperature and it has been found that a suitable product is more readily obtained at low temperatures. At high temperatures the hydrogen peroxide is destroyed without performing its function and the char does not function as efficiently in adsorbing the odorous products. Therefore, the preferred temperature of treatment is below 50° C. To obtain the best results, it is necessary that the treatment be exended over a period of hours, preferably between 12 and 24 hours.

It is desirable that the filtration as well as the treatment be carried out in the temperature range specified for the treatment because, to heat the mixture before the separation of the char, would serve to liberate, in part at least, the impurities adsorbed upon the surface of the char.

It is obvious that many changes and modifications can be made in the above-described procedures without departing from the nature and spirit of the invention. It is therefore to be understood that the invention is not to be limited except as set forth in the appended claims.

I claim:

1. The removal of odorous and odor-forming constituents from glycerol which comprises maintaining glycerol in contact with an activated vegetable carbon for such a period of time that a 50% aqueous solution of filtered glycerol so contacted when heated to 75° C. with one-half its equivalent amount of 0.5% solution of sulfuric acid will be substantially free from odor, the glycerol-carbon mass having a pH value of less than 7, and separating the glycerol from the carbon.

2. The removal of odorous and odor-forming constituents from glycerol which comprises maintaining glycerol in contact with an activated carbon with continuous agitation for such a period of time that a 50% aqueous solution of filtered glycerol so contacted when heated to 75° C. with one-half its equivalent amount of 0.5% solution of sulfuric acid will be substantially free from odor, the glycerol-carbon mass having a pH value of less than 7, and separating the glycerol from the carbon.

3. The removal of odorous and odor-forming constituents from glycerol which comprises maintaining glycerol in contact with an activated carbon at a temperature of less than 50° C. for such a period of time that a 50% aqueous solution of filtered glycerol so contacted when heated to 75° C. with one-half its equivalent amount of 0.5% solution of sulfuric acid will be substantially free from odor, the glycerol-carbon mass having a pH value of less than 7, and separating the glycerol from the carbon.

4. The removal of odorous and odor-forming constituents from glycerol which comprises maintaining glycerol in contact with an activated carbon for such a period of time that a 50% aqueous solution of filtered glycerol so contacted when heated to 75° C. with one-half its equivalent amount of 0.5% solution of sulfuric acid will be substantially free from odor, the glycerol-carbon mass having a pH value of less than 7, and separating the glycerol from the carbon.

5. The removal of odorous and odor-forming constituents from glycerol which comprises maintaining glycerol in contact with an activated carbon for a period of at least 6 hours, the glycerol-carbon mass having a pH value of less than 7, and separating the glycerol from the carbon.

6. The removal of odorous and odor-forming constituents from glycerol which comprises maintaining glycerol in contact with an activated vegetable carbon for a period of at least 6 hours, the glycerol-carbon mass having a pH value of less than 7, and separating the glycerol from the carbon.

7. The removal of odorous and odor-forming constituents from glycerol which comprises maintaining glycerol in contact with an activated carbon for a period of at least 6 hours with continuous agitation, the glycerol-carbon mass having a pH value of less than 7, and separating the glycerol from the carbon.

8. The removal of odorous and odor-forming constituents from glycerol which comprises maintaining glycerol in contact with an activated carbon for a period of at least 6 hours at a temperature of less than 50° C., the glycerol-carbon mass having a pH value of less than 7, and separating the glycerol from the carbon.

9. The removal of odorous and odor-forming constituents from glycerol which comprises mixing with glycerol finely divided, activated vegetable carbon the water extract of which is distinctly acid, maintaining said carbon in contact with said glycerol for a period of at least 6 hours, and separating the glycerol from the carbon.

10. The removal of odorous and odor-forming constituents from glycerol which comprises mixing with glycerol finely divided, activated vegetable carbon the water extract of which is distinctly acid, maintaining said carbon in contact with said glycerol for a period of at least 6 hours with continuous agitation, and separating the glycerol from the carbon.

11. The removal of odorous and odor-forming constituents from glycerol which comprises mixing with glycerol finely divided, activated vegetable carbon the water extract of which is distinctly acid, maintaining said carbon in contact with said glycerol for a period of at least 6 hours at a temperature of less than 50° C., and separating the glycerol from the carbon.

12. The removal of odorous and odor-forming constituents from glycerol which comprises maintaining glycerol in contact with an activated carbon and an oxidizing agent which will release nascent oxygen during the process for a period of at least 6 hours, the glycerol-carbon-oxidizing agent mass having a pH value of less than 7, and separating the glycerol from the carbon.

13. The removal of odorous and odor-forming constituents from glycerol which comprises maintaining glycerol in contact with an activated carbon and an oxidizing agent which will produce hydrogen peroxide in the process for a period of at least 6 hours at a temperature of less than 50° C., the glycerol-carbon-oxidizing agent mass having a pH value of less than 7, and separating the glycerol from the carbon.

14. The removal of odorous and odor-forming constituents from glycerol which comprises maintaining glycerol in contact with an activated carbon and hydrogen peroxide for a period of at least 6 hours, the glycerol-carbon-hydrogen peroxide mass having a pH value of less than 7, and separating the glycerol from the carbon.

15. The removal of odorous and odor-forming constituents from glycerol which comprises maintaining glycerol in contact with an activated carbon and hydrogen peroxide for a period of at least 6 hours at a temperature of less than 50° C., the glycerol-carbon-hydrogen peroxide mass having a pH value of less than 7, and separating the glycerol from the carbon.

16. The removal of odorous and odor-forming constituents from glycerol which comprises mixing with glycerol finely divided, activated vegetable carbon, the water extract of which is distinctly acid and hydrogen peroxide, maintaining said carbon and hydrogen peroxide in contact with said glycerol for a period of at least 6 hours, and separating the glycerol from said carbon.

GILBERT W. BRANT.